United States Patent [19]

Ogawa et al.

[11] Patent Number: 4,645,176
[45] Date of Patent: Feb. 24, 1987

[54] CONTROL VALVE

[75] Inventors: Hiroshi Ogawa, Suita; Yoshiteru Sonoda, Osaka; Ryosuke Dohi, Higashiosaka, all of Japan

[73] Assignee: Fujikin International, Inc., Osaka, Japan

[21] Appl. No.: 756,105

[22] Filed: Jul. 18, 1985

[30] Foreign Application Priority Data

Jul. 19, 1984 [JP] Japan ................................. 59-151100

[51] Int. Cl.⁴ ............................................. F16K 31/06
[52] U.S. Cl. ............................ 251/129.08; 251/129.19
[58] Field of Search ........................ 251/129.08, 129.19

[56] References Cited
FOREIGN PATENT DOCUMENTS

57-90476  6/1982  Japan .............................. 251/129.08

Primary Examiner—Arnold Rosenthal
Attorney, Agent, or Firm—Armstrong, Nikaido, Marmelstein & Kubovcik

[57] ABSTRACT

A control valve comprising a vertical tubular yoke having a bottom wall, a solenoid mounted on the upper end of the yoke for giving a force of attraction the magnitude of which is in proportion to the value of input current, the solenoid having an operating rod directed downward and movable longitudinally thereof by the force of attraction, a valve body connected to the bottom wall of the yoke, a valve stem vertically movably supported by the valve body and having an upper portion extending upward from the valve body into the yoke, and conversion means housed in the yoke for converting the force of attraction acting on the operating rod to a displacement of the valve stem.

6 Claims, 10 Drawing Figures

CONTROL VALVE

The present invention relates to a control valve, and more particularly to a control valve which is useful for controlling the flow rate of a fluid, for example, when several kinds of fluids are to be mixed together in a predetermined ratio.

While control valves of the diaphragm type are usually used for such purpose, they have the following problems. First, the rangeability is small because a diaphragm is used. Second, the valve requires a compressed air source and piping for supplying compressed air. Third, the valve is influenced by external conditions such as temperature because compressed air is used, while the use of a spring for returning the diaphragm involves increased hysteresis. Fourth, the necessity to use compressed air, diaphragm and spring results in reduced resolving power. Fifth, the use of compressed air entails the problem of pressure drop, which renders the valve unamenable to remote control. Lastly, compressed air is further compressed upon reaching the diaphragm when supplied thereto, so that the valve operation is low in responsiveness to commands.

The main object of the present invention is to provide a control valve which is free of all the foregoing problems.

To fulfill the above object, the present invention provides a control valve which comprises a vertical tubular yoke having a bottom wall, a solenoid mounted on the upper end of the yoke for giving a force of attraction the magnitude of which is in proportion to the value of input current, the solenoid having an operating rod directed downward and movable longitudinally thereof by the force of attraction, a valve body connected to the bottom wall of the yoke, a valve stem vertically movably supported by the valve body and having an upper portion extending upward from the valve body into the yoke, and conversion means housed in the yoke for converting the force of attraction acting on the operating rod to a displacement of the valve stem.

Because the control valve of the present invention is operated by a solenoid, the valve has increased rangeability, permits use of a thin optial fiber cable, is reduced in hystresis and has an increased resolving power. Since the solenoid is electrically operated, the valve is of course amenable to remote control. The operation of the valve, which is effected by the solenoid, is exceedingly more responsive than when compressed air is used.

Embodiments of the present invention will be described with reference to the accompanying drawings for illustrative purposes only.

Figure 1:
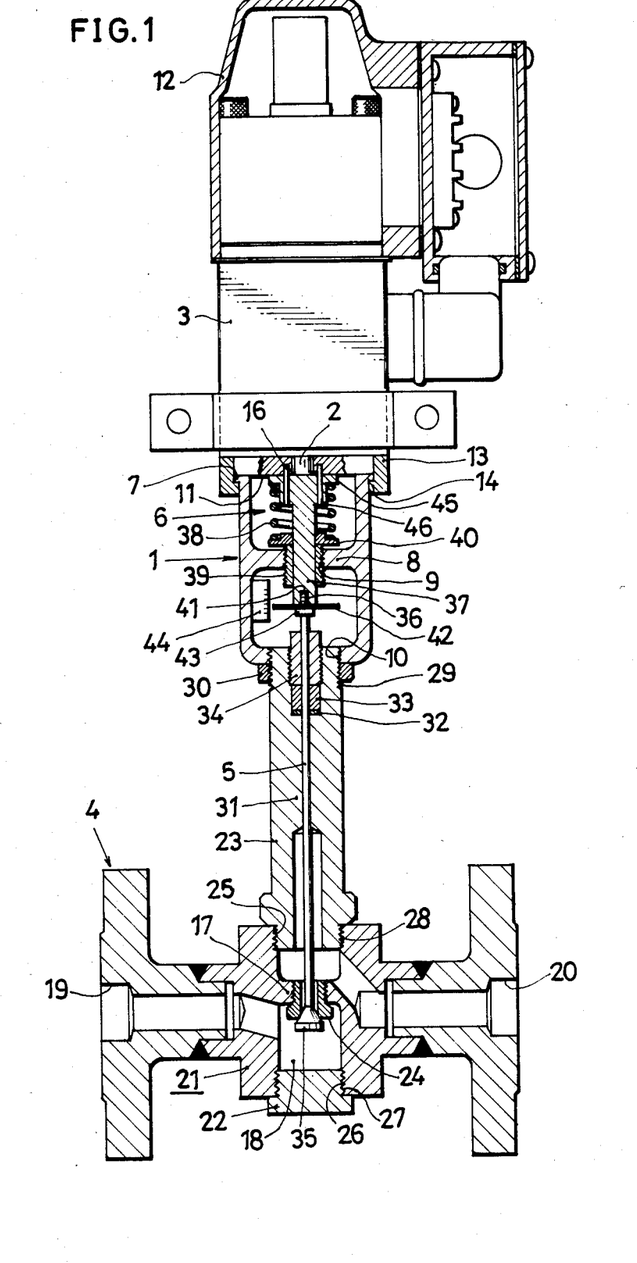
FIG. 1 is a vertical longitudinal sectional view showing an embodiment of control valve.
Figure 2:
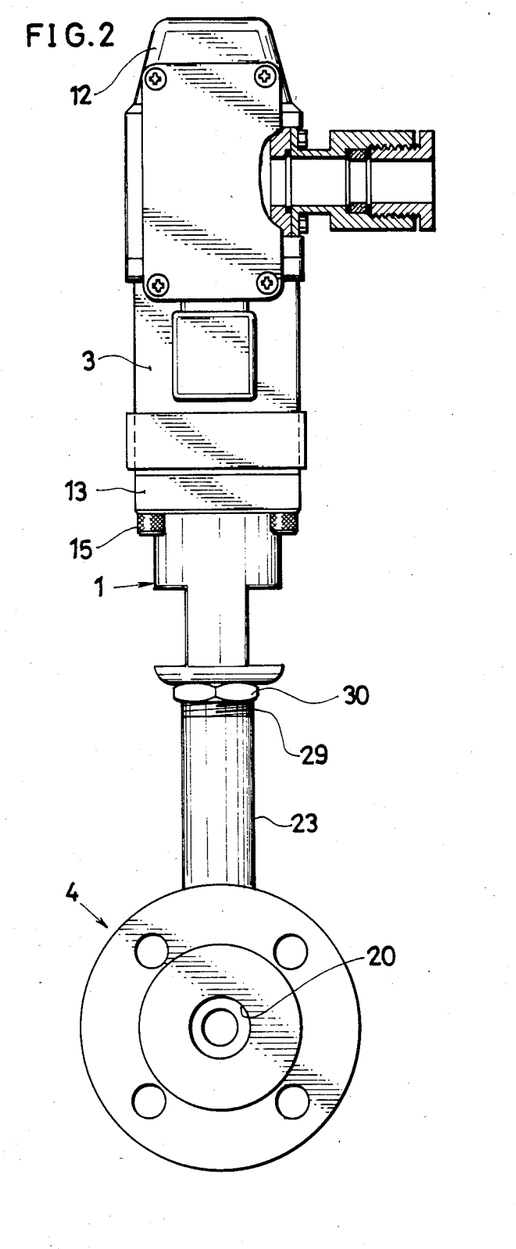
FIG. 2 is a side elevation showing the same.

FIGS. 1 and 2 show a control valve which comprises a vertical tubular yoke 1 having a bottom wall, a solenoid 3 mounted on the upper end of the yoke 1 for giving a force of attraction the magnitude of which is in proportion to the value of input current, the solenoid 3 having an operating rod 2 directed downward and movable longitudinally thereof by the force of attraction, a valve body 4 connected to the bottom wall of the yoke 1, a valve stem 5 vertically movably supported by the valve body 4 and having an upper portion extending upward from the valve body 4 into the yoke 1, and conversion means 6 housed in the yoke 1 for converting the force of attraction acting on the operating rod 2 to a displacement of the valve stem 5.

The peripheral wall of the yoke 1 is partly cut out to form opposed openings for access to the interior of the yoke. The yoke 1 has an outer flange 7 at its upper end. The interior of the yoke 1 is divided into upper and lower portions by a partition wall 8, which is formed with a threaded bore 9. The bottom wall of the yoke 1 also has a threaded bore 10.

The solenoid 3 has a case the bottom of which provides a mount surface 11 for covering an upper open end of the yoke 1. A caplike cover 12 covers the upper half of the solenoid. An annular mount member 13 is fitted to the bottom of the solenoid case and has an inner flange 14 which is engaged from below with the outer flange 7 of the yoke 1. Elongated bolts 15 extend through the mount member 13 and are screwed into the cover 12, whereby the yoke 1, solenoid 3, cover 12 and mount member 13 are united into an assembly. The solenoid 3 is of the push type. While it is unenergized, the lower end of the operating rod 2 is held slightly retracted from the mount surface 11. When the solenoid 3 is energized, the operating rod 2 is downwardly projected below the mount face 11 into the yoke 1 by the force of attraction. A pair of vertical pins 16 are implanted in the mount surface 11 at opposite sides of the rod 2.

The valve body 4 comprises a main body 21 having a valve chamber 18 having open upper and lower ends and divided into upper and lower two spaces by a partition wall 17, an inlet 19 communicating with the lower space of the valve chamber 18, and an outlet 20 communicating with the upper space of the valve chamber 18. The valve body 4 further comprises a bottom cover 22 closing the lower end opening of the valve chamber 18, and a valve closure 23 closing the upper end opening of the valve chamber 18. A seat ring 24 is fitted in, and extends vertically through, the partition wall 17. Female screws 25 and 26 are formed on the inner periphery of the main body 21 at the upper and lower ends of the chamber 18, respectively. The bottom cover 22 has a male screw 27 screwed into male screw 26 at the lower end of the chamber 18. The valve closure 23, which is in the form of a vertical tube, is externally threaded as at 28 at its lower end. The threaded end is screwed into the female screw 25 at the upper end of the valve chamber 18. The upper end of the valve closure 23 is externally threaded as at 29 and screwed into the threaded bore 10 in the bottom wall of the yoke 1. A lock nut 30 screwed on the male screw 29 is tightened up. Thus, the valve body 4 is connected to the yoke 1. The valve closure 23 is provided with a partition wall 31 at an intermediate portion of its length. Disposed within the closure 23 on the wall 31 as arranged around the valve stem 5 are a packing sheet 32, a gland 33 thereon and a screwed-in packing holder 34 on the gland.

The lower end of the valve stem 5 extends through the upper space of the valve chamger 18 into the seat ring 24. A conical plug 35 is provided at the lower end of the valve stem 5 integrally therewith. The conical surface of the plug 35 is in intimate contact with the lower end inner peripheral surface of the seat ring 24. The upper end of the valve stem 5 is externally threaded as at 36.

The conversion means 6 comprises a vertical rod 37 vertically movably retained in the yoke 1 and a compression spring 38 biasing the rod 37 upward. The vertical rod 37 has an upper end face in contact with the mount surface 11 of the solenoid 3 around the operating rod 2. The valve stem 5 is fixed at its upper end to the lower end of the vertical rod 37. A tubular adjusting screw member 39 vertically extends through the partition wall 8 of the yoke 1 and is fixed thereto in screw-thread engagement. An annular spring seat 40 is positioned on the upper end of the screw member 39. The lower portion of the vertical rod 37 extends through the spring seat 40 and through the screw member 39. The lower end of the vertical rod 37 is formed with a downwardly open threaded bore 41, in which the screw end 36 of the valve stem 5 is screwed, with an indicator plate 42 and a lock nut 43 fitting around the screw end 36. The lock nut 43 is tightened up to press the indicator plate 42 against the lower end of the rod 37. Thus, the valve stem 5 is fixed to the vertical rod 37. An indicator scale 44 is attached to the yoke 1 inside thereof at one side of the indicator plate 42. The upper end of the vertical rod 37 is integrally formed with a flange 45 and a large-diameter portion 46 continuous with the flange 45. The above-mentioned pair of vertical pins 16 extends through the flange 45 and the large-diameter portion 46. The compression spring 38 is provided around the vertical rod 37 and interposed between the flange 45 and the spring seat 40.

The characteristics of the solenoid 3 will be described in detail with reference to FIGS. 3 to 6.

Figure 3:
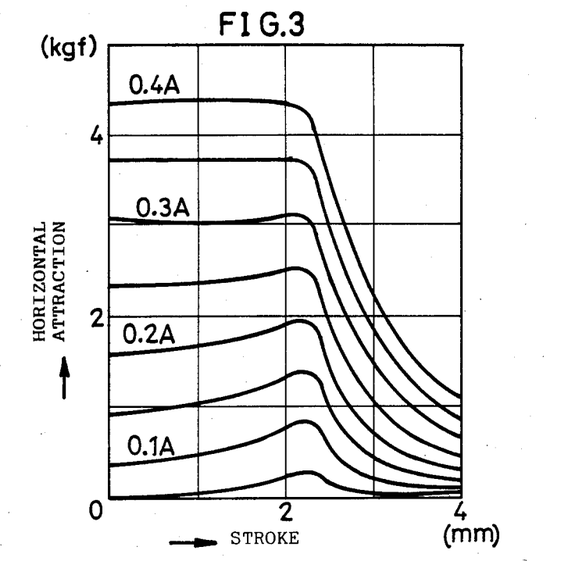
FIGS. 3 to 5 are graphs showing the characteristics of the solenoid incorporated in the control valve.
Figure 4:
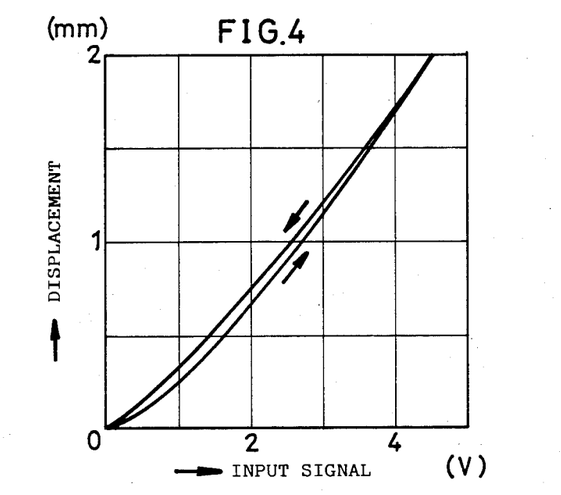
Figure 5:
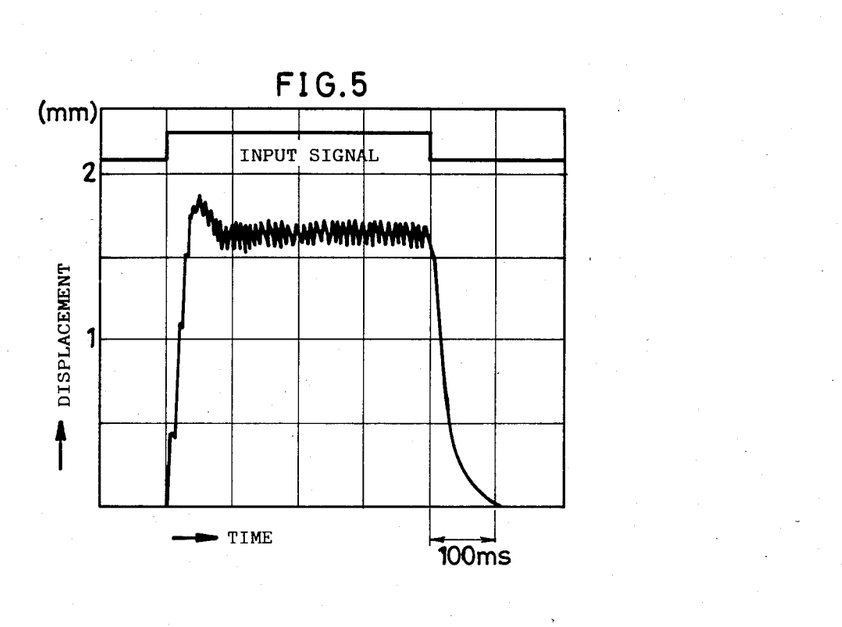
Figure 6:
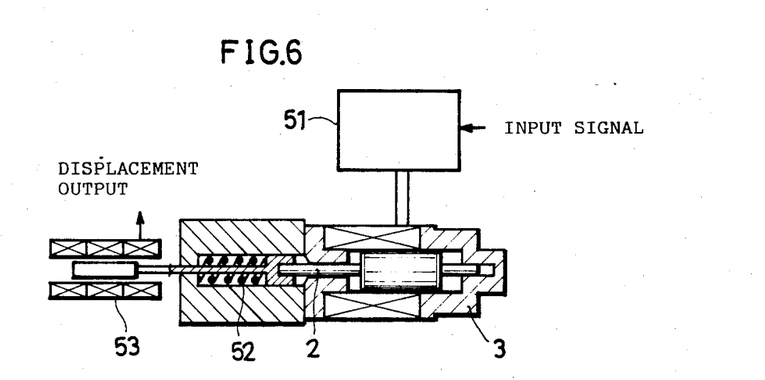
FIG. 6 is a diagram illustrating a system for measuring the characteristics.

FIG. 6 shows a system for measuring the characteristics. A controller 51 is connected to the main body of the solenoid 3. A spring 52 and a displacement gauge 53 are connected to the operating rod 2 of the solenoid 3. When a voltage signal is applied to the controller 51 from an unillustrated potentiometer or the like, the controller 51 produces a current according to the input voltage. The current is fed to the solenoid 3, causing the solenoid to produce a force of magnetic attraction. As already stated, the magnitude of the attraction is in proportion to the input current. This relationship is illustrated in FIGS. 3 and 4. FIG. 3 shows the attraction characteristics. The relationship between the stroke (mm) plotted as abscissa and the horizontal force of attraction (kgf) plotted as ordinate is illustrated as related to the value or intensity of current (A) through the solenoid 3. FIG. 4 shows the displacement characteristics, i.e. the relationship between the input signal (V) plotted as abscissa and the displacement (mm) plotted as ordinate. FIG. 5 further shows the relationship between the time (S) and the displacement (mm) showing step responsiveness.

While the solenoid is unenergized, the plug 35 is in intimate contact with the seat ring 24 to block the communication between the inlet 19 and the outlet 20 as seen in FIG. 1.

When energized, the solenoid 3 produces a force of magnetic attraction acting to move its operating rod 2 downward. The rod 2 therefore moves down against the compression spring 38, depressing the vertical rod 37. Consequently, the valve stem 5 connected to the vertical rod 37 lowers and moves the plug 35 therewith downward out of contact with the seat ring 24 to allow the inlet 19 to communicate with the outlet 20. When the solenoid 3 is de-energized, the force of attraction disappears, whereupon the spring 38 pushes up the vertical rod 37 and retracts the operating rod 2. As a result, the valve stem 5 rises, moving the plug 35 upward therewith into intimate contact with the seat ring 24 to block the communication between the inlet 19 and the outlet 20 again.

Figure 7:
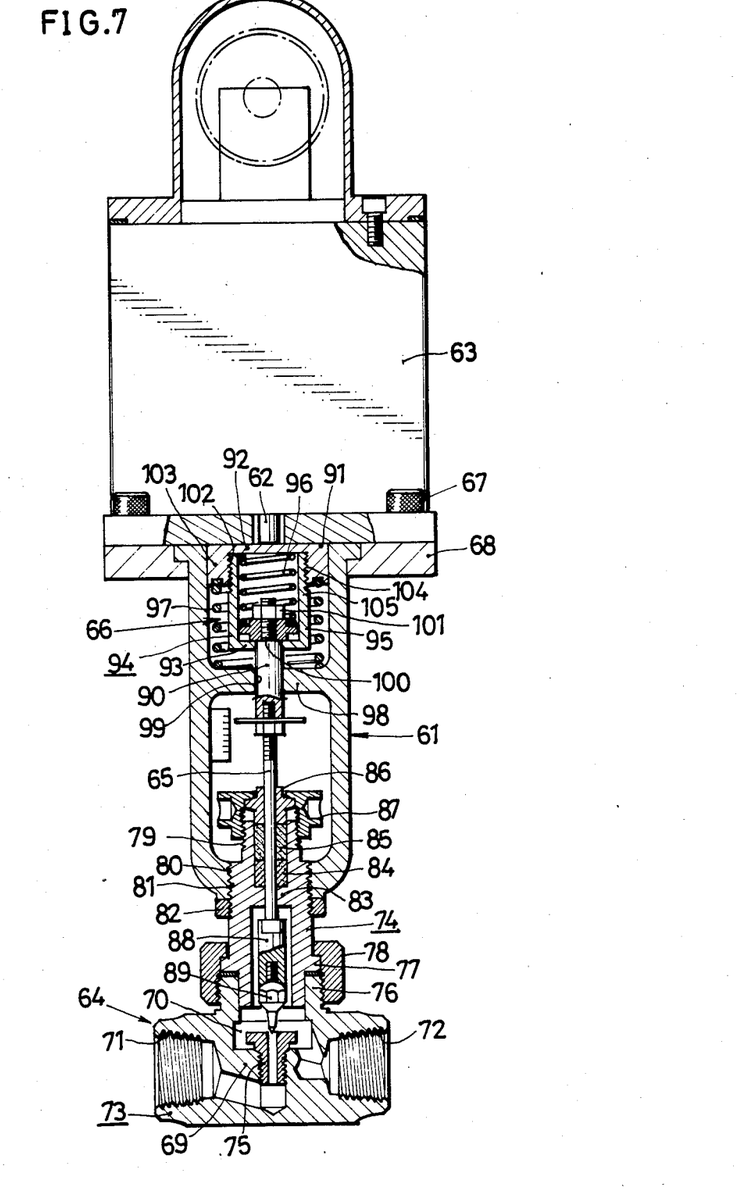
FIG. 7 is a view in vertical longitudinal section showing another embodiment.
Figure 8:
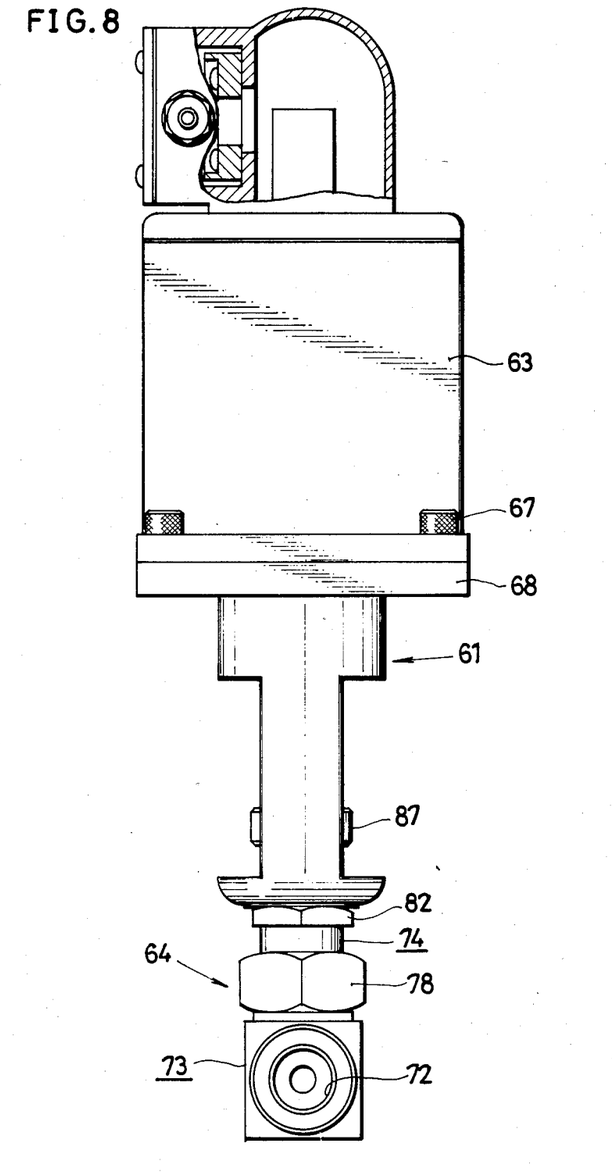
FIG. 8 is a side elevation of the same.

FIGS. 7 and 8 show another embodiment of control valve. Like the embodiment shown in FIGS. 1 and 2, this embodiment comprises a vertical tubular yoke 61 having a bottom wall, a solenoid 63 mounted on the upper end of the yoke 61 for giving a force of attraction the magnitude of which is in proportion to the value of input current, the solenoid 63 having an operating rod 62 directed downward and movable longitudinally thereof by the force of attraction, a valve body 64 connected to the bottom wall of the yoke 61, a valve stem 65 vertically movably supported by the valve body 64 and having an upper portion extending upward from the valve body 64 into the yoke 61, and conversion means 66 housed in the yoke 61 for converting the force of attraction acting on the operating rod 62 to a displacement of the valve stem 65.

The yoke 61 and the solenoid 63 are substantially the same as those shown in FIGS. 1 and 2 in construction and function and therefore will not be described in detail. However, these two units are united by short bolts 67 extending through the bottom wall of the solenoid case from above and screwed into an annular mount member 68 in engagement with the upper end of the yoke 61.

The valve body 64 comprises a main body 73 having a valve chamber 70 opened at its upper end and divided into upper and lower two spaces by a partition wall 69, an inlet 71 communicating with the lower space of the valve chamber 70 and an outlet 72 communicating with the upper space of the valve chamber 70. The valve body 64 further comprises a valve closure 74 closing the upper end opening of the valve chamber 70 and having the valve stem 65 extending therethrough. A seat ring 75 is fitted in, and extends vertically through, the partition wall 69. The main body 73 is provided with a tubular screw portion 76 projecting upward and communicating with the valve chamber 70. The valve closure 74, which is in the form of a vertical tube, has a flange 77 toward its lower end. The portion of the closure 74 above the flange 77 is fitted in the tubular screw portion 76. A packing nut 78 is fitted over the flange 77 and screwed on the screw portion 76. The valve closure 74 has at its upper end a small-diameter screw portion 79 and a large-diameter screw portion 80 below the portion 79, with a step formed therebetween. The large-diameter screw portion 80 is screwed into a threaded bore 81 formed in the bottom wall of the yoke 61, and a lock nut 82 is screwed on the portion 80 in pressing contact with the yoke 61, whereby the valve body 64 is connected to the yoke 61. The valve closure 74 is provided with a partition wall 83 at an intermediate portion of its length. Disposed within the closure 74 on the wall 83 as arranged around the valve stem 65 are a packing sheet 84, a gland 85 and the lower half of a flanged packing holder 86 on the gland. A packing holding nut 87 is fitted over the holdeer 86 and screwed on the small-diameter screw portion 79.

The valve stem 65 is provided at its lower end with a large-diameter portion 88. An inverted conical plug 89 having a needle is fixedly screwed into the portion 88 from below. The conical surface of the plug 89 is opposed to the upper end inner periphery of the seat ring 75 and spaced therefrom by a predetermined distance.

The conversion means 66 comprises a vertical rod 90 vertically movably retained in the yoke 61 and fixed at its lower end to the upper end of the valve stem 65; a hollow movable member 94 having a top wall 92 and a bottom wall 93, the top wall 92 being in contact with the mount surface 91 of the solenoid 63 around the operating rod 62, the upper end of the vertial rod 90 vertically movably extending through the bottom wall 93 of the movable member 94; an engaging member 95 fixed to the upper end of the vertical rod 90 and in engagement with the bottom wall 93 of the movable member 94 from above; an inner compression coiled spring 96 disposed inside the movable member 94 and interposed between the top wall 92 and the engaging member 95; and an outer compression coiled spring 97 disposed outside the movable member 94 and biasing the movable member 94 upward.

The yoke 61 has a partition wall 98 which is formed with a through bore 99. The vertical rod 90 fittingly extends through the bore 99. The valve stem 65 is fixed to the vertical rod 90 by the same means as in the foregoing embodiment. The vertical rod 90 has a stepped portion toward its upper end, and upwardly beyond this portion, the upper end is externally threaded as as 100. The engaging member 95, which is annular, is fitted around the threaded upper end 100 of the rod 90 and placed on the stepped portion. A nut 101 is fitted to the threaded end 100 from above the engaging member and screwed thereon to fasten the member 95 in place. A downwardly extending peripheral wall 103 is formed at the periphery of the top wall 92 of the movable member 94, slidably fitted in the yoke 61 and internally threaded as at 102. An upstanding peripheral wall 105 externally threaded as at 104 and screwed into the internally threaded wall 103 is formed at the periphery of the bottom wall 93 of the member 94. The outer compression spring 97 is fitted around the upstanding wall 105 and interposed between the lower end of the downward wall 103 and the partition wall 98.

While the solenoid 63 is unenergized, the conical surface of the plug 89 is opposed to the upper end inner periphery of the seat ring 75 and spaced therefrom by the predetermined distance as stated above and shown in FIG. 7. The inlet 71 is therefore in communication with the outlet 72. When the solenoid 63 is energized in this state, the solenoid produces a force of magnetic attraction acting to move the operating rod 62 downward, thus projecting the rod 62 against the outer spring 97 to depress the movable member 94 and the vertical rod 90. Consequently, the valve stem 65 connected to the vertical rod 90 moves down along with the plug 89, bringing the plug 89 into intimate contact with the seat ring 75 to block the communication between the inlet 71 and the outlet 72. As the operating rod 62 further moves down, the movable member is lowered with the rod 62 by compressing inner spring 96, although the valve stem 65 and the vertical rod 90 are prevented from moving down. As a result, the plug 89 is pressed against the seat ring 75 by a spring force corresponding to the amount of compression of the spring 96.

Figure 9:
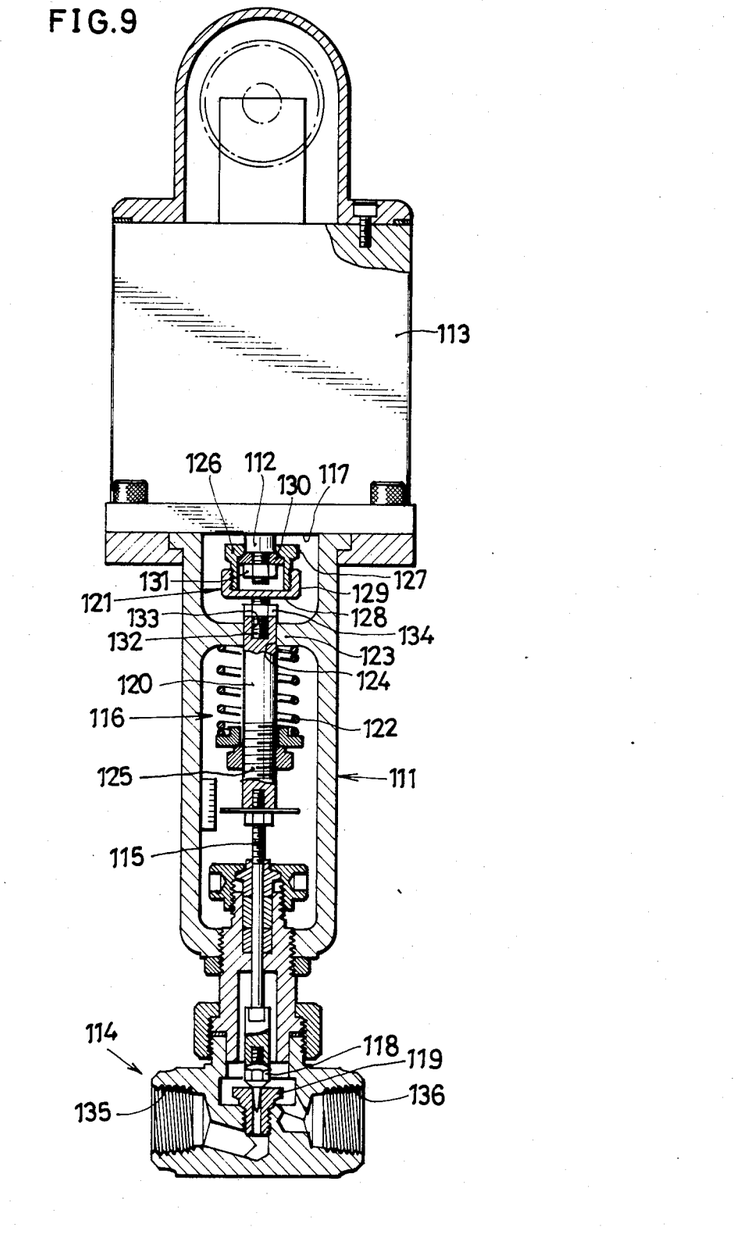
FIG. 9 is a view in vertical longitudinal section showing still another embodiment.
Figure 10:
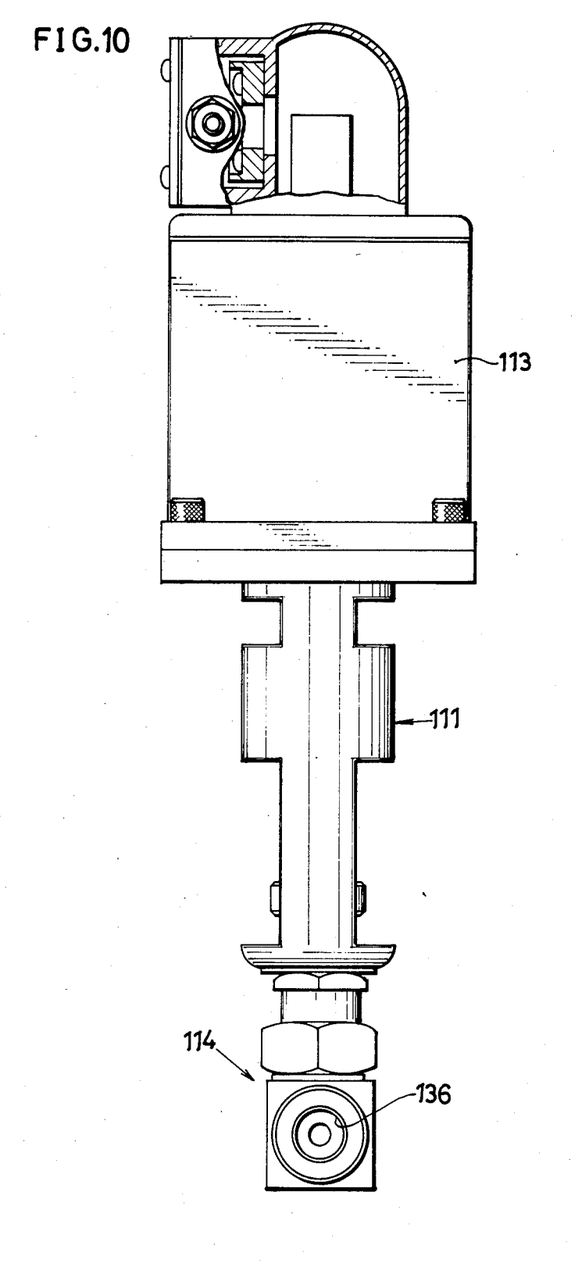
FIG. 10 is a side elevation of the same.

FIGS. 9 and 10 show another embodiment of control valve.

Like the foregoing two embodiments, this valve comprises a vertical tubular yoke 111 having a bottom wall, a solenoid 113 mounted on the upper end of the yoke 111 for giving a force of attraction the magnitude of which is in proportion to the value of input current, the solenoid 113 having an operating rod 112 directed downward and movable longitudinally thereof by the force of attraction, a valve body 114 connected to the bottom wall of the yoke 111, a valve stem 115 vertically movably supported by the valve body 114 and having an upper portion extending upward from the valve body 114 into the yoke 111, and conversion means 116 housed in the yoke 111 for converting the force of attraction acting on the operating rod 112 to a displacement of the valve stem 115.

The yoke 111, the solenoid 113 and the valve body 114 are substantially the same as those shown in FIGS. 7 and 8 in construction and therefore will not be described in detail. However, whereas the solenoids 3 and 63 of the foregoing two embodiments are of the push type, the solenoid 113 of this embodiment is of the pull type. While the solenoid 113 is unenergized, the operating rod 112 is held projected downward below the mount surface 117 into the yoke 111, but when energized, the solenoid 113 produces a force of attraction acting to move the operating rod 112 upward.

As in the second embodiment, the lower end of the valve stem 115 is provided with an inverted conical plug 118 having a needle. However, the plug 118 is in intimate contact with the upper end inner periphery of a seal ring 119.

The conversion means 116 comprises a vertical rod 120 vertically movably retained in the yoke 111 and fixed at its lower end to the upper end of the valve stem 115, a connecting member 121 fixed to the upper end of the vertical rod 120 and connected to the lower end of the operating rod 112 of the solenoid 113 so as to be movable upward with the operating rod 112, and a compression spring 122 biasing the vertical rod 120 downward. The yoke 111 has a partition wall 123 formed with a thorough bore 124, with the vertical rod 120 fittingly extending therethrough. The rod 120 is externally threaded as at 125 at a portion thereof below the partition wall 123 and toward the lower end of the rod 120. The connecting member 121 comprises a tubular screw member 127 having a top wall 126 and an internally threaded tubular member 129 having a bottom wall 128 and in screw-thread engagement with the tubular screw member 127. The lower end of the operating member 112 extends through the top wall 126. An engaging member 130 engaged with the top wall 128 from below is fixed to the lower end of the operating rod 112 by a nut 131. The bottom wall 128 has a downwardly projecting screw portion 132 screwed into a threaded bore 133 in the upper end of the vertical rod 120. A lock nut 134 screwed on the screw portion 132 is pressed against the upper end of the vertical rod 120.

While the solenoid 113 is unenergized, the plug 118 is in intimate contact with the seat ring 119, holding the inlet 113 out of communication with the outlet 136 as seen in FIG. 9. When the solenoid 113 is energized in this state, the solenoid 113 produces a force of magnetic attraction acting to move the operating rod 112 upward. The rod 112 therefore moves upward against the spring 122, causing the connecting member 121 to pull up the vertical rod 120. Consequently, the valve stem 115 connected to the rod 120 moves up with the plug 118, bringing the plug 118 out of contact with the seat ring 119 and allowing the inlet 135 to communicate with the outlet 136.

We claim:
1. A control valve comprising:
   (a) a vertical tubular yoke having a bottom wall,
   (b) a solenoid mounted on the upper end of the yoke for giving a force of attraction the magnitude of which is in proportion to the value of the input current, the solenoid having an operation rod directed downward and movable longitudinally thereof by the force of attraction,
   (c) a valve body connected to the bottom wall of the yoke,
   (d) a valve stem vertically movably supported by the valve body and having an upper portion extending upward from the valve body into the yoke,
   (e) conversion means housed in the yoke for converting the force of attraction acting on the operating rod to a displacement of the valve stem,
   wherein said solenoid being of the push type and having a mount surface covering an upper end opening of the yoke, the operating rod being downwardly movable below the mount surface into the yoke by the force of attraction when the solenoid is energized; the valve body comprising a main body having a valve chamber opened at its upper and lower ends and divided into upper and lower two spaces by a partition wall, an inlet communicating with the lower space of the valve chamber and an outlet communicating with the upper space of the valve chamber, the valve body further comprising a bottom cover closing the lower end opening of the valve chamber and a valve closure closing the upper end opening of the valve chamber and having the valve stem extending therethrough; a seat ring being fitted in and extending vertically through the partition wall, the valve stem having a lower end extending through the upper space of the valve chamber into the seat ring, a conical plug being provided at the lower end of the valve stem, the conical surface of the plug being in intimate contact with the lower end inner peripheral surface of the seat ring; the conversion means comprising a vertical rod vertically movably retained in the yoke and a compression spring biasing the vertical rod upward, the vertical rod having an upper end face in contact with the mount surface of the solenoid around the operating rod, the valve stem being fixed at its upper end to the lower end of the vertical rod.

2. A control valve as defined in claim 1 wherein the yoke is internally formed with a partition wall dividing its interior into upper and lower portions, a tubular adjusting screw member vertically extending through the partition wall of the yoke and being fixed thereto in screw-thread engagement, an annular spring seat being positioned on the upper end of the adjusting screw member, the vertical rod having a lower portion extending through the spring seat and through the adjusting screw member, the vertical rod having a flange integral with its upper end, the compression spring being provided around the vertical rod and interposed between the flange and the spring seat.

3. A control valve as defined in claim 1 wherein the solenoid is of the push type and has a mount surface covering an upper end opening of the yoke, the operating rod being downwardly movable below the mount surface into the yoke by the force of attraction when the solenoid is energized; the valve body comprising a main body having a valve chamber opened at its upper end and divided into upper and lower two spaces by a partition wall, an inlet communicating with the lower space of the valve chamber and an outlet communicating with the upper space of the valve chamber, the valve body further comprising a valve closure closing the upper end opening of the valve chamber and having the valve stem extending therethrough; a seat ring being fitted in and extending vertically through the partition wall, the valve stem being provided with an inverted conical plug at its lower end, the conical surface of the plug being opposed to the upper end inner periphery of the seat ring and spaced therefrom by a predetermined distance; the conversion means comprising a vertical rod vertically movably retained in the yoke and fixed at its lower end to the upper end of the valve stem, a hollow movable member having a top wall and a bottom wall, the top wall being in contact with the mount surface of the solenoid around the operating rod, the upper end of the vertical rod vertically movably extending through the bottom wall of the movable member, an engaging member fixed to the upper end of the vertical rod and in engagement with the bottom wall of the movable member from above, an inner compression coiled spring disposed inside the movable member and interposed between the top wall and the engaging member, and an outer compression coiled spring disposed outside the movable member and biasing the movable member upward.

4. A control valve as defined in claim 3 wherein the yoke is internally formed with a partition wall dividing its interior into upper and lower portions and formed with a through bore, the vertical rod fittingly extending through the through bore, the top wall of the movable member being provided at its periphery with a downwardly extending peripheral wall slidably fitted in the yoke and internally threaded, the bottom wall of the movable member being formed at its periphery with an upstanding peripheral wall externally threaded and screwed in the downwardly extending peripheral wall, the outer compression spring being fitted around the upstanding wall and interposed between the lower end of the downwardly extending wall and the partition wall of the yoke.

5. A control valve as defined in claim 1 wherein the solenoid is of the pull type and has a mount surface covering an upper end opening of the yoke, the operating rod being held projected downward below the mount surface into the yoke while the solenoid is unenergized but being upwardly movable by the force of attraction when the solenoid is energized; the valve body comprising a main body having a valve chamber opened at its upper end and divided into upper and lower two spaces by a partition wall, an inlet communicating with the lower space of the valve chamber and an outlet communicating with the upper space of the valve chamber, the valve body further comprising a valve closure closing the upper end opening of the valve chamber and having the valve stem extending therethrough; a seat ring being fitted in and extending vertically through the partition wall, the valve stem being provided with an inverted conical plug at its lower end, the conical surface of the plug being in intimate contact with the upper end inner periphery of the seat ring; the conversion means comprising a vertical rod vertically movably retained in the yoke and fixed at its lower end to the upper end of the valve stem, a connecting member fixed to the upper end of the vertical rod and connected to the lower end of the operating rod of the solenoid so as to be movable upward with the operating rod, and a compression spring biasing the vertical rod downward.

6. A control valve as defined in claim 5 wherein the yoke is internally formed with a partition wall dividing its interior into upper and lower portions and formed with a through bore, the vertical rod fittingly extending through the through bore and being externally threaded at a portion thereof below the yoke partition wall and toward the lower end of the vertical rod, the connecting member comprising a tubular screw member having a top wall and an internally threaded tubular member having a bottom wall and in screw-thread engagement with the tubular screw member, the lower end of the operating member extending through the top wall, an engaging member being engaged with the top wall from below and being fixed to the lower end of the operating rod, the tubular member bottom wall having a downwardly projecting screw portion screwed into the upper end of the vertical rod.

* * * * *